G. HAUCK
Wagon-Brake.
No. 17,506. Patented June 9, 1857.
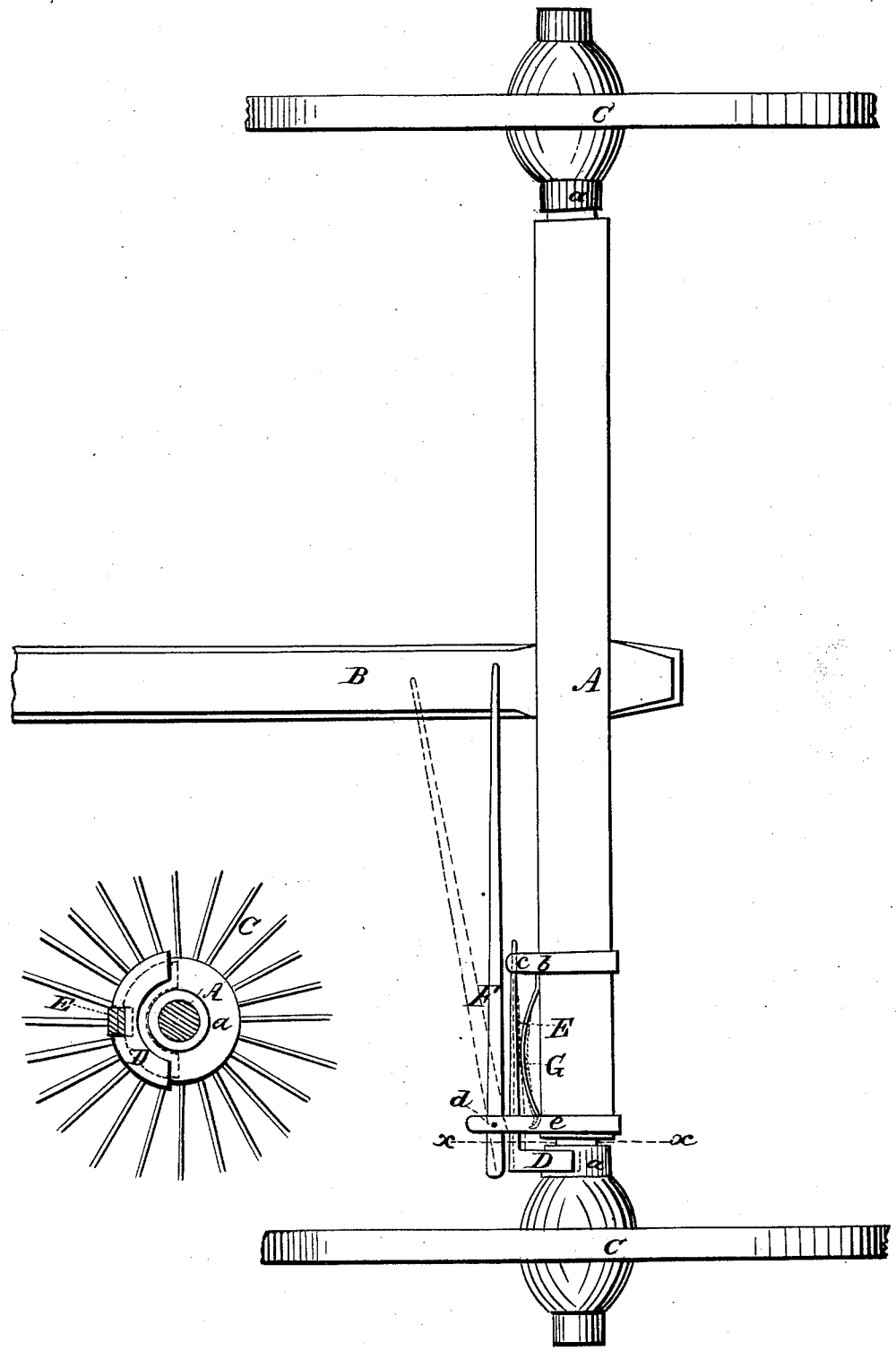

UNITED STATES PATENT OFFICE.

GEO. HAUCK, OF MECHANICSBURG, PENNSYLVANIA.

CARRIAGE-BRAKE.

Specification of Letters Patent No. 17,506, dated June 9, 1857.

*To all whom it may concern:*

Be it known that I, GEORGE HAUCK, of Mechanicsburg, in the county of Cumberland and State of Pennsylvania, have invented a new and useful Improvement in Locks for Light Wagons and Carriages; and I do hereby declare that the following is a full, clear, and exact description of the same, reference being had to the accompanying drawings, forming part of this specification, in which—

Figure 1, is a plan or top view of my improvement applied to the axle of a wagon. Fig. 2, is a transverse section of the same.

Similar letters of reference in each of the two figures indicate corresponding parts.

My improvement relates particularly to locks which are arranged directly upon the front axle of light wagons and carriages.

The object of the same is to cause the locking block to bear perfectly square upon the inner collar of the hub, instead of incliningly as commonly.

The nature of the improvement consists in providing the locking block with an extension arm, and pivoting it by said arm to a bracket of the axle at a point some distance from the point of contact with the hub, and arranging it relatively to a lever for applying it to the hub, and to a spring for throwing it off the same, as presently described. By this arrangement the lever, which applies the locking block to the hub, when brought in contact with the block, is not capable of causing the block to cant or incline, but always causes it to bear squarely upon the hub—owing to the block being held firmly down by the pivoted extension.

To enable others skilled in the art to make and use my invention, I will proceed to describe its construction and operation.

A, represents the axle, B, the tongue and C, C, the wheels of a wagon.

D, E, is the locking block made of semi-ring form at D, so as to correspond to the circle of the collar *a*, of the hub of the wheel, and allow the hub to slide smoothly within it. The arm E, of this block is made flat, and extends along the front of the axle about one foot and a half and is then pivoted to a bracket *b*, of the axle as shown at *c*.

F, is the lever for applying the locking block. It is arranged to bear with its outer end on the part D, of the locking block, and is pivoted as at *d*, to a bracket *e*, of the axle. To the inner end of this lever a cord leading up to the driver may be attached so that by pulling it the lever will be caused to assume the position shown in red, and thereby made to operate upon the locking block and force it squarely in contact with the inner collar of the hub, the locking block being kept square and prevented from inclining by being pivoted at *c*.

G, is a flat spring for throwing the locking block, etc., out of locking position as soon as the lever F, is let free.

This lock is well adapted for light carriages, as it is neat, and can be applied directly to the axle. It is also quite simple and cheap and yet very effective in its operation.

I do not claim the arranging of a lock on the axle of a wagon. Neither do I claim locking the wheel by means of a pin attached to a lever, arranged in the axle. Nor do I claim locking the wheel by means of a sliding clutch; both of said methods being old and objectionable on account of causing the wheel to be stopped suddenly, without allowing it a chance to slide and thus causing damage to the lock by the breaking off of the stop pin or teeth of the clutch, but What I do claim as my invention and desire to secure by Letters Patent, is—

Providing the semicircular locking block D, with an extension arm E, and pivoting it to a bracket of the axle some distance from the point of contact with the hub, and arranging it relatively to the lever F, and spring G, substantially as and for the purpose herein set forth.

GEO. HAUCK.

Witnesses:
ROBT. FENWICK,
GOODWIN YORKE AT LEE,
EDM. F. BROWN.